(12) United States Patent
Vinogradov et al.

(10) Patent No.: US 11,922,260 B2
(45) Date of Patent: *Mar. 5, 2024

(54) MACHINE VISION DEVICES WITH CONFIGURABLE ILLUMINATION AND AIMING PATTERN GENERATION

(71) Applicant: ZEBRA TECHNOLOGIES CORPORATION, Lincolnshire, IL (US)

(72) Inventors: Igor Vinogradov, Oakdale, NY (US); Eric Trongone, Coram, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 1 day.

This patent is subject to a terminal disclaimer.

(21) Appl. No.: 17/743,780

(22) Filed: May 13, 2022

(65) Prior Publication Data

US 2022/0350980 A1 Nov. 3, 2022

Related U.S. Application Data

(63) Continuation of application No. 17/242,634, filed on Apr. 28, 2021, now Pat. No. 11,334,733.

(51) Int. Cl.
*G06K 7/10* (2006.01)
(52) U.S. Cl.
CPC ..... *G06K 7/10732* (2013.01); *G06K 7/10742* (2013.01); *G06K 7/1098* (2013.01)

(58) Field of Classification Search
CPC .......... G06K 7/10732; G06K 7/10742; G06K 7/1098
See application file for complete search history.

(56) References Cited

U.S. PATENT DOCUMENTS

| 2019/0294830 A1* | 9/2019 | Rietschel ............... G06K 7/081 |
| 2021/0159664 A1 | 5/2021 | Liu et al. |

OTHER PUBLICATIONS

International Search Report and Written Opinion for International Application No. PCT/US2022/023960 dated May 5, 2022.

* cited by examiner

*Primary Examiner* — Jamara A Franklin
(74) *Attorney, Agent, or Firm* — Yuri Astvatsaturov (57) ABSTRACT

Machine vision devices with configurable illumination and aiming pattern generation are disclosed. An example system includes a housing having a cavity; an imaging sub-assembly mounted in the cavity including: an imager configured to capture an image; an aiming light source mounted in the housing configured to generate a collimated beam of light, an illumination light source configured to generate illumination light; and interchangeable first and second cover plates configured for mounting to the housing in front of the imaging sub-assembly to form an external cover for the housing and sealably protect the imager from an environment, wherein the first and second cover plates have respective passive optical elements that modify the collimated beam of light to form respective aiming patterns, and wherein at least one of the first cover plate or the second cover plate has a third optical element that modifies the illumination light.

20 Claims, 7 Drawing Sheets

MACHINE VISION DEVICES WITH CONFIGURABLE ILLUMINATION AND AIMING PATTERN GENERATION

CROSS-REFERENCE TO RELATED APPLICATION

This application is a continuation of U.S. patent application Ser. No. 17/242,634, filed on Apr. 28, 2021, and incorporated herein by reference in its entirety.

BACKGROUND

Machine vision devices capture images within a given imaging field of view (FOV). Illumination and aiming pattern need to match the imaging FOV. Therefore, illumination and aiming pattern generators are often different for different applications and often require different individual parts. Thus, usually multiple configurations of a machine vision device are stocked, for example, wide angle, mid-range, and long range. If a customer needs a different type of illumination and/or aiming pattern, they may need to replace the machine vision device, or replace multiple optical components, which makes it difficult to (re-)configure the machine vision device. Therefore, it would be beneficial to have an easy, quick way to (re-)configure illumination and aiming pattern with less labor and fewer steps to follow.

SUMMARY

In an embodiment, the present invention is a system including a housing having a cavity; an imaging sub-assembly mounted in the cavity, the imaging sub-assembly including: an imager configured to capture an image of a portion of an environment in an imaging FOV; an aiming light source mounted in the housing configured to generate a collimated beam of light, wherein the aiming light source is offset from the imaging sub-assembly; an illumination light source configured to generate illumination light; and interchangeable first and second cover plates configured for mounting to the housing in front of the imaging sub-assembly to form an external cover for the housing and sealably protect the imager from an environment, wherein the first and second cover plates have respective first and second passive optical elements that modify the collimated beam of light to form respective first and second aiming patterns, and wherein at least one of the first cover plate or the second cover plate has a third optical element that modifies the illumination light.

In a variation of this embodiment, the imaging sub-assembly further includes a lens group configurable to support first and second imaging FOVs, wherein the first cover plate, when mounted, supports the first imaging FOV, and wherein the second cover plate, when mounted, supports the second imaging FOV.

In a variation of this embodiment, the imaging sub-assembly further includes a lens group configurable to support first and second imaging FOVs, wherein the first passive optical element, when the first cover plate is mounted, forms a first aiming pattern in the first imaging FOV, and wherein the second passive optical element, when the second cover plate is mounted, forms a second aiming pattern in the second imaging FOV.

In a variation of this embodiment, the first and second cover plates are integrally formed.

In a variation of this embodiment, the first cover plate is formed of a single piece of optical grade plastic transparent for the light from the light source to pass through, such as polycarbonate, acrylic, Zeonex, etc.

In a variation of this embodiment, the first passive optical element includes: one or more diffractive optical elements; and an optical wedge configured to adjust an axis of the first aiming pattern relative to an axis of the collimated beam of light, and wherein the first passive optical element is at least one of formed, molded or inset in the first cover plate.

In a variation of this embodiment, the first passive optical element is patterned to generate the first aiming pattern as structured light.

In a variation of this embodiment, the imaging sub-assembly further includes a second illumination light source configured to generate second illumination light, wherein the first cover plate further includes a fourth optical portion configured to direct at least some of the second illumination light into the imaging FOV.

In a variation of this embodiment, the aiming light source includes a laser diode and a collimating lens.

In a variation of this embodiment, the third optical element includes a lens molded into the first cover plate to focus the illumination light and direct the illumination light toward the imaging FOV.

In a variation of this embodiment, neither the first cover plate nor the second cover plate has an image modifying element.

In another embodiment, the present invention is an imaging system comprising: a housing; and an imaging sub-assembly mounted in the housing, the imaging sub-assembly including: an imager to capture an image of a portion of an environment in a FOV; an aiming light source mounted in the housing configured to generate a collimated beam of light, wherein the aiming light source is offset from the imaging sub-assembly; and an illumination light source configured to generate illumination light, wherein the housing is configured to receive interchangeable first and second cover plates for mounting to the housing in front of the imaging sub-assembly to form an external cover for the housing and sealably protect the imager from an environment, wherein the first and second cover plates have respective first and second passive optical elements that modify the collimated beam of light to form respective aiming patterns, and wherein at least one of the first cover plate or the second cover plate has an optical element that modifies the illumination light.

In yet embodiment, the present invention is a method of assembling a machine vision device, the method comprising: providing an assembly including: a housing having a cavity; an imaging sub-assembly in the cavity; an aiming light source in the cavity configured to generate a collimated beam of light, wherein the aiming light source is offset from the imaging sub-assembly; and an illumination light source; configuring the imaging sub-assembly to capture an image of a portion of an environment in an imaging FOV; configuring the illumination light source to generate illumination light; and selecting one of interchangeable first and second cover plates based at least on the configured imaging FOV; and mounting the selected one of the interchangeable first and second cover plates to the housing to form an external cover for the housing and sealably protect the imaging sub-assembly from an environment, wherein the first and second cover plates have respective first and second passive optical elements that modify the collimated beam of light to form respective first and second aiming patterns, and wherein at least one of the first cover plate or the second cover plate has an optical element that modifies the illumination light.

In a variation of this embodiment, the method further comprises: unmounting the selected one of the interchangeable first and second cover plates from the housing; configuring the imaging sub-assembly to capture an image of a portion of an environment in a different imaging FOV; and mounting the unselected one of interchangeable first and second cover plates to the housing.

In a variation of this embodiment, neither of the first cover plate or the second cover plate has an image modifying element.

In a variation of this embodiment, the imaging sub-assembly includes a lens group configurable to support first and second imaging FOVs, wherein the first passive optical element, when the first cover plate is mounted, forms a first aiming pattern in the first imaging FOV, and wherein the second passive optical element, when the second cover plate is mounted, forms a second aiming pattern in the second imaging FOV.

In a variation of this embodiment, the first and second cover plates are integrally formed.

In a variation of this embodiment, the first passive optical element includes: one or more diffractive optical elements; and an optical wedge configured to adjust an axis of an aiming pattern relative to an axis of the collimated beam of light, and wherein the first passive optical element is at least one of formed, molded, or inset in the first cover plate.

In a variation of this embodiment, the aiming light source includes a laser diode and a collimating lens.

In a variation of this embodiment, the third optical element includes a lens and/or a wedge molded into for formed in the first cover plate to focus the illumination light and direct the illumination light toward the imaging FOV.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Machine vision devices having user- and/or field-replaceable interchangeable front cover plates are disclosed herein. Disclosed front cover plates are easily installed, integral pieces that include passive optical elements to simultaneously modify illumination and/or aiming light generated by a machine vision device to correspond to an intended use and/or application. For example, if a machine vision device is to be configured and used for machine vision with an imaging FOV of 30 degrees, then a front cover plate that generates an aiming pattern with a 30 degree spread and a corresponding illumination pattern may be installed and used. However, the same machine vision device can be used to, for example, read direct product markings (DPMs) by reconfiguring the machine vision device for a close focus distance, and installing a different front cover plate that generates an illuminated aiming pattern from the aiming light generated by the machine vision device using a diffuser with a small hole for an aiming dot to pass through. Disclosed front cover plates, when installed, additionally form an external protective cover for a machine vision device and sealably protect an imager of the machine vision device from an environment. In some examples, angles of the aiming pattern and/or the illumination pattern are modified to center them within an imaging FOV at a predetermined distance from the system. Because the front cover plates are integral pieces, they enable a machine vision device to be easily adapted to an intended use without having to manipulate and/or install multiple small optical pieces. Thus, a single model of machine vision device can be adapted for multiple intended uses through software configuration and the simple installation of a corresponding front plate cover. As used herein, being integral means that a front cover plate is installed and/or removed as a single piece even if multiple pieces (e.g., lenses, lenslets, wedges, diffractive optical elements (DOEs), etc.) were originally combined, at manufacturing, to form the single piece. After manufacturing, the front cover plates disclosed herein are intended to be used as single pieces and are not intended to be disassembled, even if possible, into their constituent parts.

Figure 1:
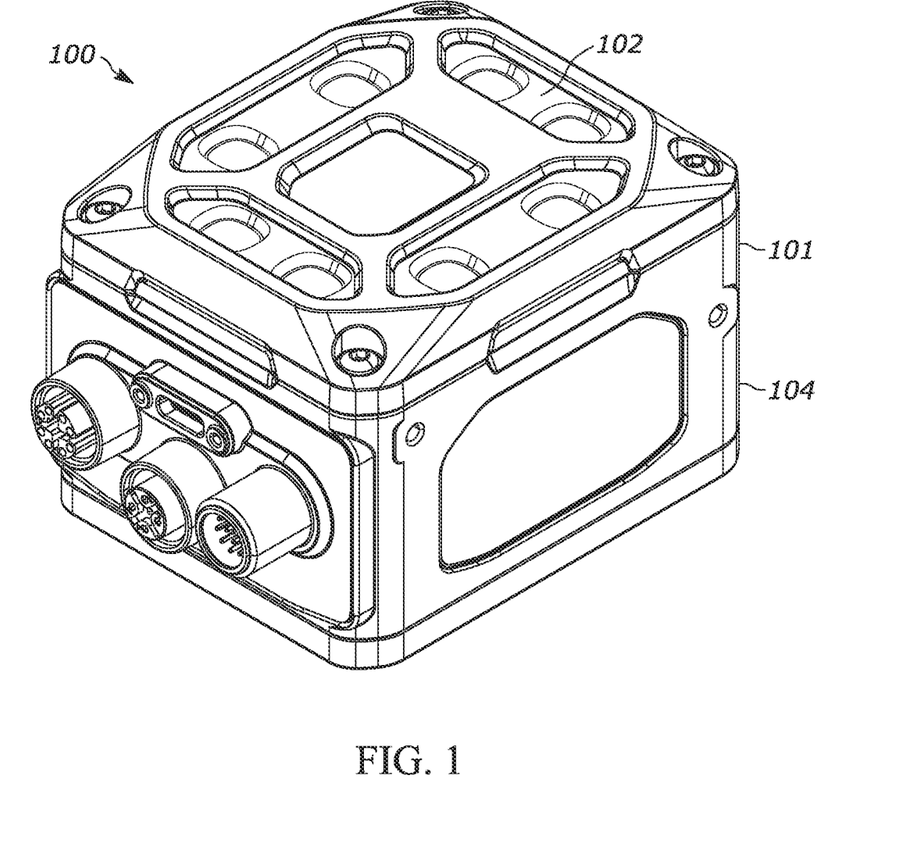
FIG. 1 is an isometric view of an example machine vision device having an interchangeable front cover plate in accordance with some embodiments.
Figure 2:
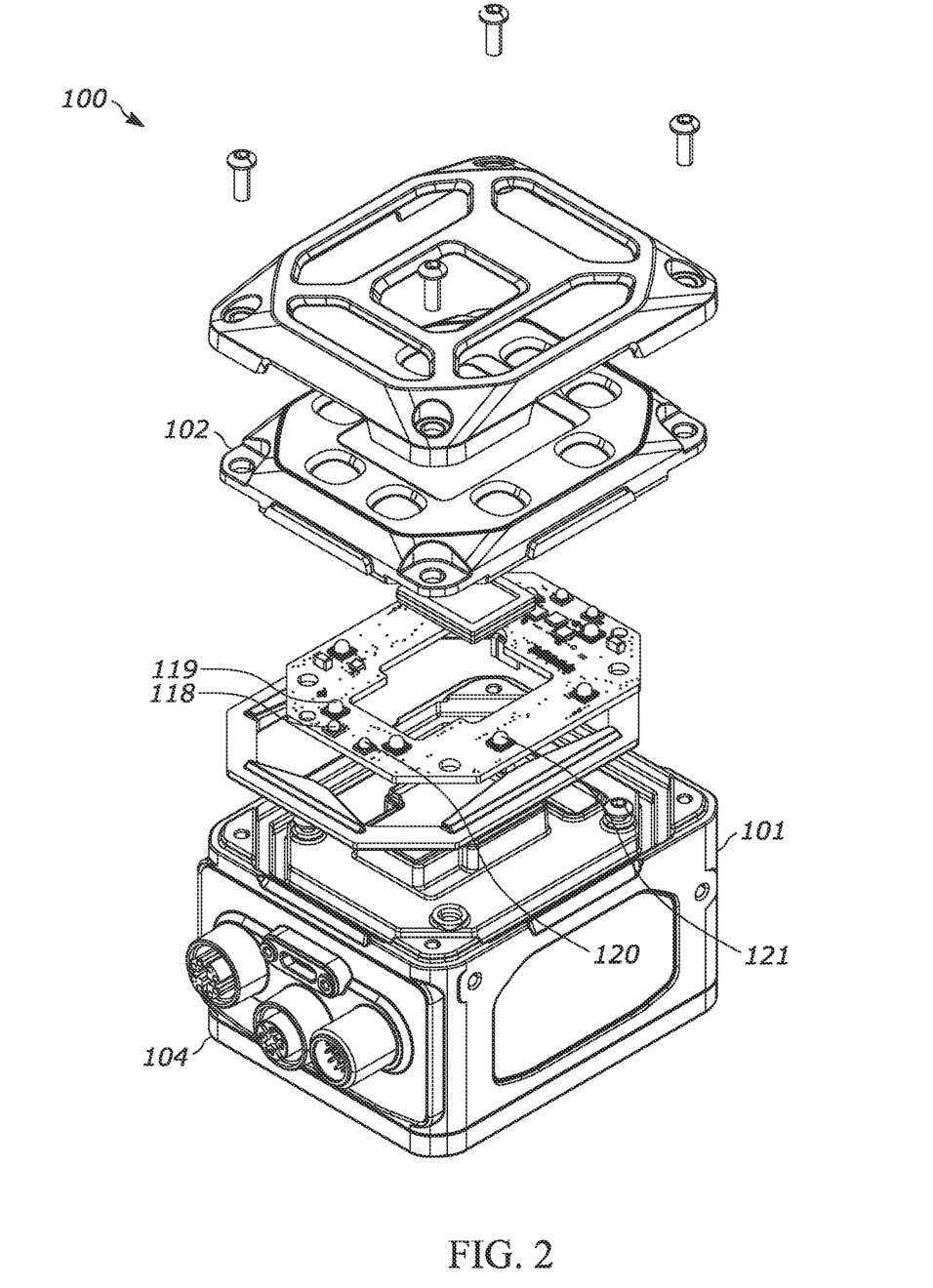
FIG. 2 is a partially exploded view of the machine vision device of FIG. 1.
Figure 3:
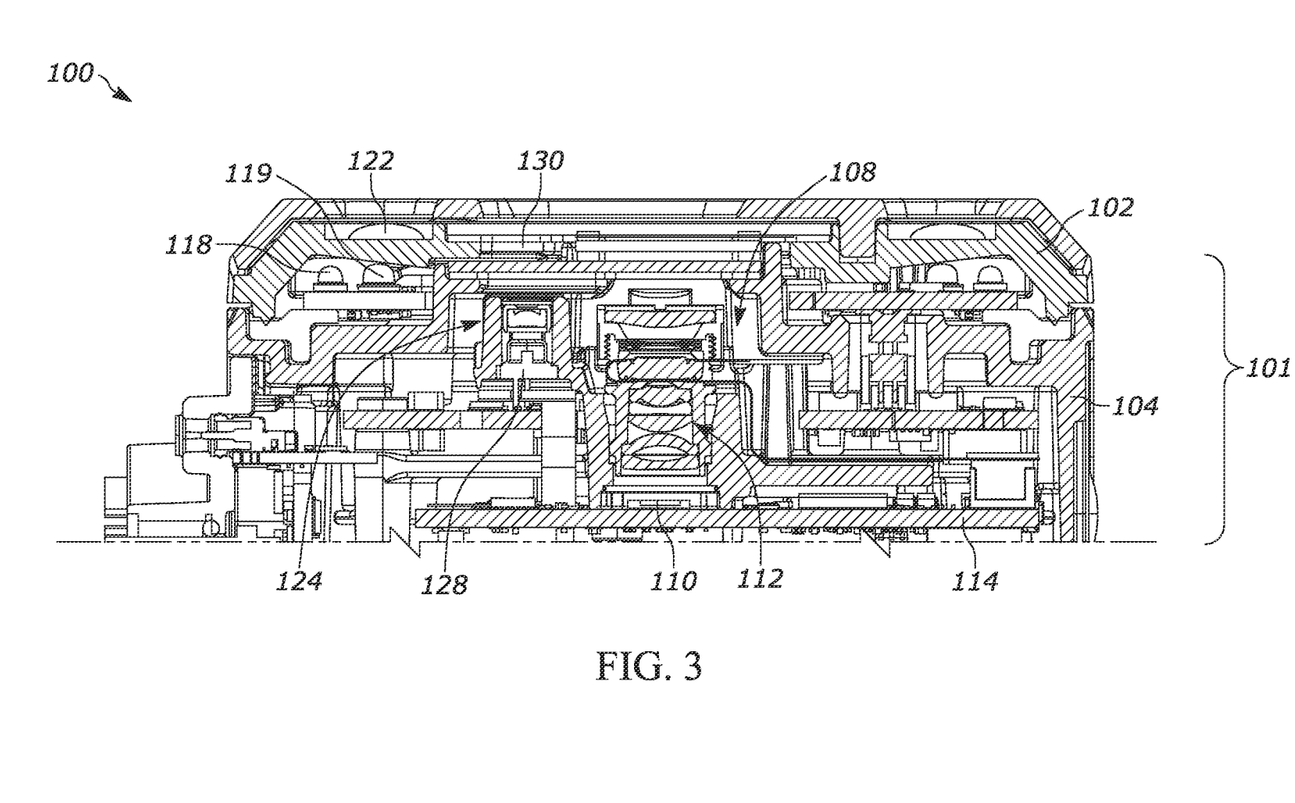
FIG. 3 is a cross-sectional side view of the machine vision device of FIG. 1.
Figure 4:
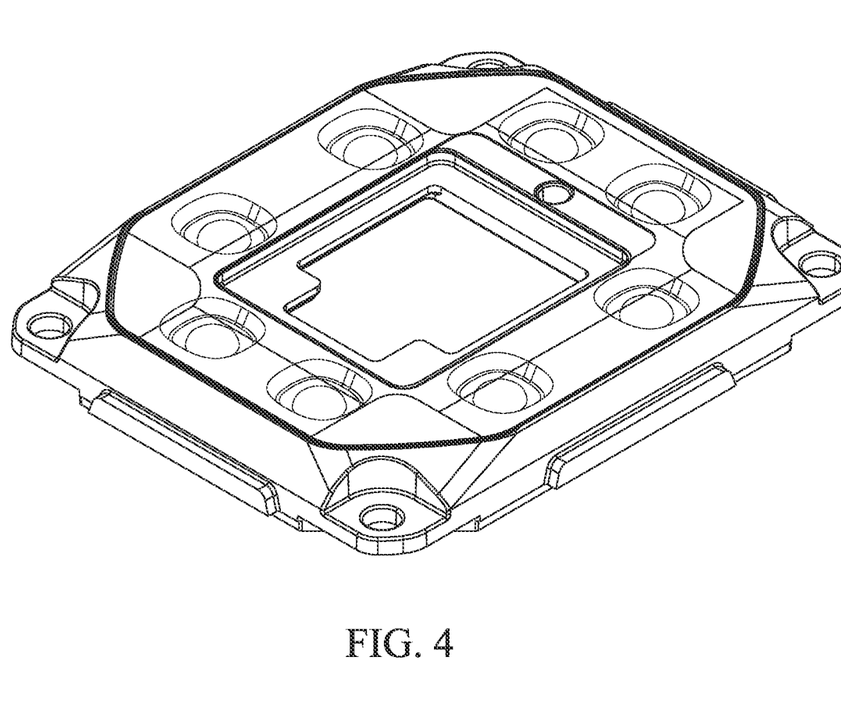
FIG. 4 is an isometric view of the example front cover plate of FIGS. 1-3.
Figure 5:
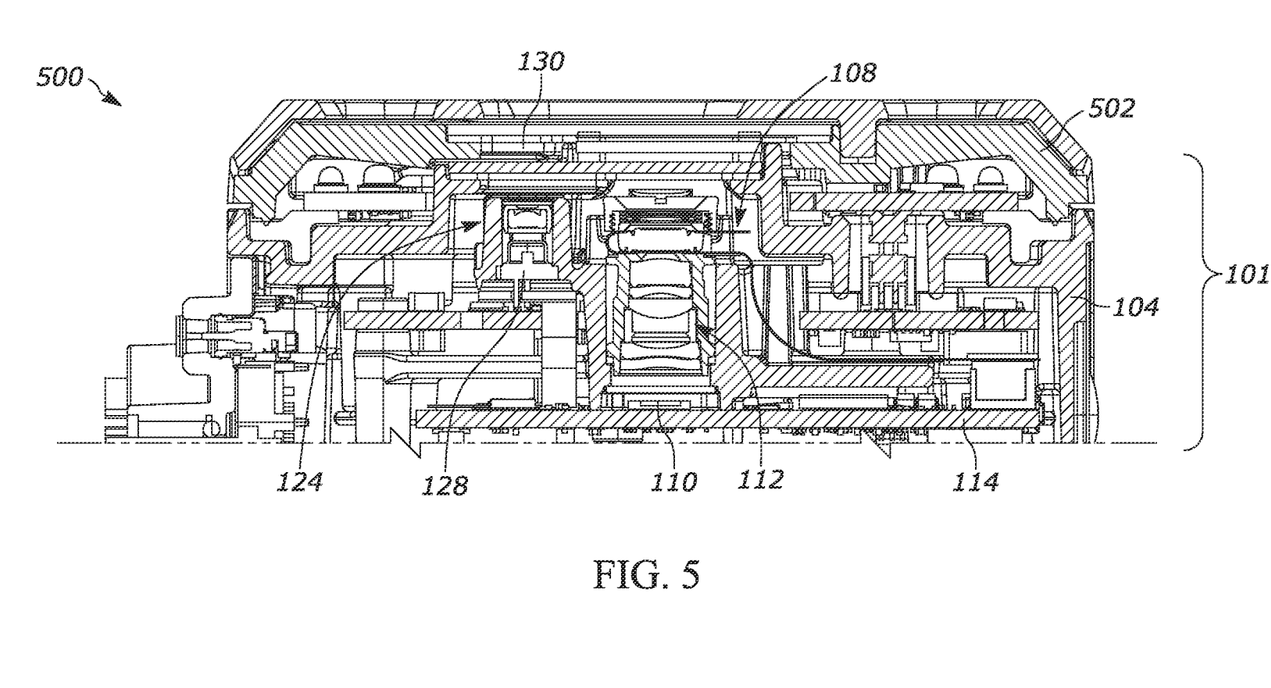
FIG. 5 is a cross-sectional side view of the machine vision device of FIG. 1 with a different interchangeable front cover plate installed.
Figure 6:
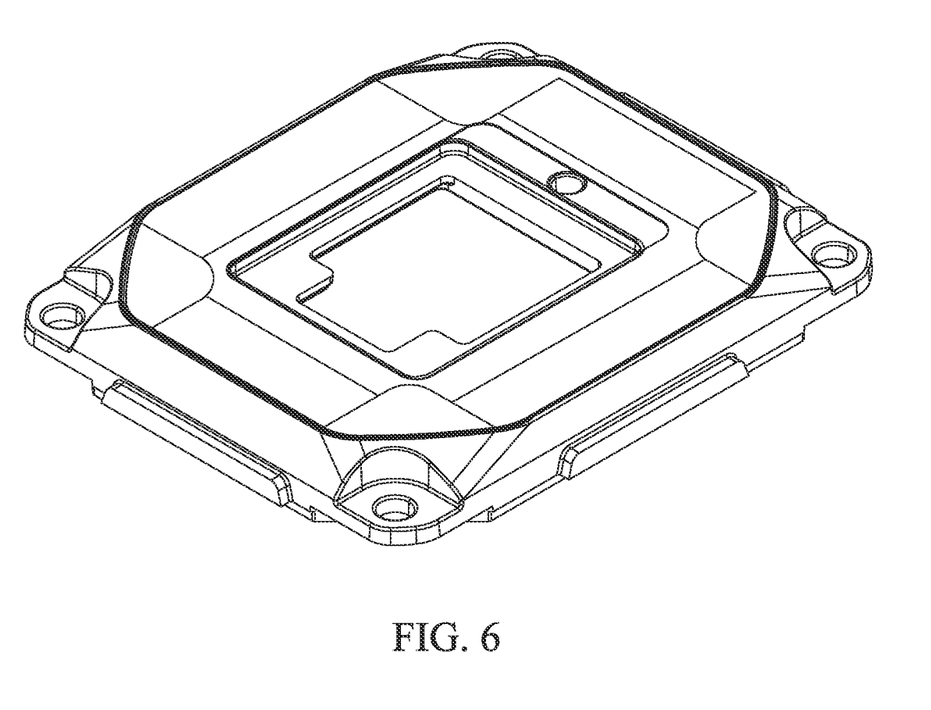
FIG. 6 is an isometric view of the example front cover plate of FIG. 5.

FIGS. 1-3 illustrate a first example machine vision device 100 having an example camera assembly 101 and a first example interchangeable front cover plate 102. FIG. 4 is an isometric view of the example front cover plate 102 of FIGS. 1-3. FIG. 5 illustrates a second example machine vision device 500 having the same camera assembly 101 and a second, different example interchangeable front cover plate 502. FIG. 6 is an isometric view of the example front cover plate of FIG. 5. As is clearly shown in FIGS. 1 and 2, the front cover plates 102, 502 may be assembled to the camera assembly 101 with a plurality of screws to enable easy installation and easy uninstallation.

The camera assembly 101 includes a housing 104, and an imaging sub-assembly 106 disposed within a cavity 108 in the housing 104. The imaging sub-assembly 106 includes an image sensor 110, and a lens group 112 that allows for images of objects to be formed on the image sensor 110.

The machine vision device 100 may be adapted to be inserted into a docking station, etc. (not shown) which, in some examples, may include a power source to provide power for the machine vision device 100. The machine vision device 100 may further include an onboard power supply (not shown) such as a battery, and a printed circuit board (PCB) 114 which may accommodate a memory and a controller that controls operation of the machine vision device 100. The machine vision device 100 may include any number of additional components such as decoding systems, processors, and/or circuitry coupled to the PCB 114 to assist in operation of the machine vision device 100.

In an embodiment, the image sensor 110 is a solid-state device, for example, a CCD or a CMOS imager, having a one-dimensional array of addressable image sensors or pixels arranged in a single row, or a two-dimensional array of addressable image sensors or pixels arranged in mutually orthogonal rows and columns, and operative for detecting return light captured by the lens group 112 over an imaging FOV along an imaging axis that is normal to the substantially flat image sensor 110 through an imaging portion or zone 115 of the window cover plate 102. The return light is scattered and/or reflected from a target over the FOV. In some embodiments, the imaging axis is coaxial with a central axis of the lens group 112. The lens group 112 is operative for focusing the return light onto the array of image sensors to enable the target to be read. In particular, the light that impinges on the pixels is sensed and the output of those pixels produce image data that is associated with the environment that appears within the FOV (which can include the target). This image data may be processed by a controller (e.g., by being sent to a decoder) which identifies and decodes decodable indicia captured in the image data. Once the decode is performed successfully, the reader can signal a successful "read" of the target (e.g., a barcode).

The lens group 112 may also be fixedly mounted relative to the housing 104 using any number of components and/or approaches. The lens group 112 is configurable to focus at different distances and/or to image over different fields of view (FOVs). For example, with a FOV of 30 degrees, a FOV of 46 degrees, at far distances, at close distances (e.g., on a DPM), etc.

In the illustrated example, the housing 104 includes an illumination system configured to illuminate a target object for imaging. The illumination system may include an illumination PCB 116 and one or more illumination light sources, four of which are designated at reference numerals 118-121. Example illumination light sources 118-121 include light emitting diodes, laser diodes, black body radiation sources, or another illumination light sources mounted to the illumination PCB 116. The front cover plate 102 may include one or more passive optical elements (e.g., lenses, wedges, etc.) for respective ones of the illumination light sources 118-121 that will be used (i.e., turned on) for a particular application for dispersing or focusing optical radiation for illumination of a target object. For example, in the example configuration of FIG. 3, the illumination light source 118 is disabled, the illumination light source 119 is enabled, and the front cover plate 102 includes an in-molded lens 122 to focus the illumination light emitted by the illumination light source 120 on to a target. In the example configuration of FIG. 5, the portion of the front cover plate 502 associated with the illumination light source 120 is left is optically blank to allow the diffuse illumination light 504 generated by the illumination light source 120 to diffusely illuminate the imaging FOV 506.

Figure 7:
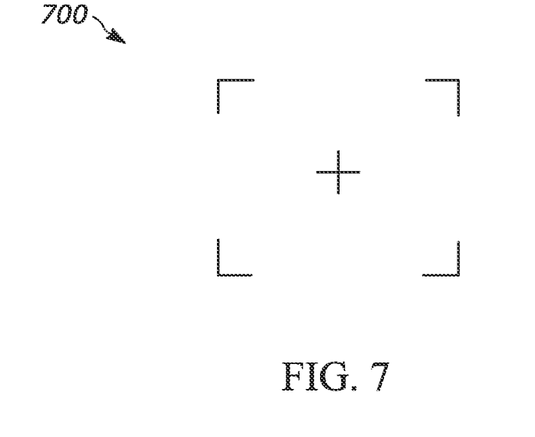
FIG. 7 illustrates an example illuminated aiming pattern that may be generated by the example machine vision devices of FIGS. 1-3 and 5.

In the illustrated example, the housing 104 includes an aiming pattern generator 124 configured to generate an illuminated aiming pattern, such as an example pattern 700 shown in FIG. 7. To generate aiming light, the aiming pattern generator 124 includes an aiming light source 128. An example aiming light source 128 is as a collimated beam source having a laser diode and collimating lens to generate a collimated beam of light. To modify the aiming light generated by the aiming light source 128 to form the illuminated aiming pattern 126, the front cover plate 102 may include one or more passive optical elements 130, such as a pattern of one or more DOEs (e.g., beam splitters, pattern generators, beam shapers, gratings, etc.) or other beam shaping elements. The front cover plate 102 may also include an optical wedge to tilt the illuminated aiming pattern 126, i.e., to tilt a propagation axis thereof, such that the aiming pattern 126 falls in the imaging FOV at a particular distance. The optical wedge may be formed into an entrance side of the front cover plate 102, an exit side of the front cover plate 102, or by a combination of alterations to both. The DOE may be formed on either the entrance side or the exit side and may be formed on an opposite side of the optical wedge, in some examples.

In another example, the portion of a front cover plate corresponding to the aiming light source 128 is patterned to form a known pattern of light that may be projected onto a surface. When a machine vision device having the front cover plate views the pattern from one (or more) different perspectives, the surface features of a target distort the pattern. The direction and size of the pattern distortions may be used to reconstruct the surface topography of the target object, thereby enabling a device, system, etc. including the machine vision device to extract three dimensional (3D) information. In another example, the portion of a front cover plate corresponding to the aiming light source 128 is patterned to correspond to a customer's logo so that the customer's logo is an aiming pattern.

While examples disclosed herein are described with reference to changing a front cover plate to adapt a machine vision device, camera, etc. for different applications, uses, etc., it should be obvious that other imaging devices (e.g., handheld, gun-style barcode readers) may be similarly adapted for different applications, uses, etc. by changing a front window, etc. having portions that affect illumination light and aiming light.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A system comprising:
a housing having a cavity;
an imaging sub-assembly mounted in the cavity, the imaging sub-assembly including:
an imager configured to capture an image of a portion of an environment in an imaging field of view (FOV);
an aiming light source mounted in the housing configured to generate a beam of light, wherein the aiming light source is offset from the imaging sub-assembly;
an illumination light source configured to generate illumination light; and
interchangeable first and second cover plates configured for mounting to the housing in front of the imaging sub-assembly to form an external cover for the housing and sealably protect the imager from an environment,
wherein the first and second cover plates have respective first and second passive optical elements that modify the beam of light to form respective first and second aiming patterns, and
wherein at least one of the first cover plate or the second cover plate has a third optical element that modifies the illumination light.

2. The system of claim 1, wherein the imaging sub-assembly further includes a lens group configurable to support first and second imaging FOVs, wherein the first cover plate, when mounted, supports the first imaging FOV, and wherein the second cover plate, when mounted, supports the second imaging FOV.

3. The system of claim 1, wherein the imaging sub-assembly further includes a lens group configurable to support first and second imaging FOVs, wherein the first passive optical element, when the first cover plate is mounted, forms a first aiming pattern in the first imaging FOV, and wherein the second passive optical element, when the second cover plate is mounted, forms a second aiming pattern in the second imaging FOV.

4. The system of claim 1, wherein the first and second cover plates are integrally formed.

5. The system of claim 1, wherein the first cover plate is formed of a single piece of optical grade plastic.

6. The system of claim 1, wherein the first passive optical element includes:
one or more diffractive optical elements; and
an optical wedge configured to adjust an axis of the first aiming pattern relative to an axis of the beam of light, and
wherein the first passive optical element is at least one of formed, molded or inset in the first cover plate.

7. The system of claim 1, wherein the first passive optical element is patterned to generate the first aiming pattern as structured light.

8. The system of claim 1, wherein the imaging sub-assembly further includes a second illumination light source configured to generate second illumination light, wherein the first cover plate further includes a fourth optical portion configured to direct at least some of the second illumination light into the imaging FOV.

9. The system of claim 1, wherein the aiming light source includes a laser diode and a collimating lens.

10. The system of claim 1, wherein the third optical element includes a lens molded into the first cover plate to focus the illumination light and direct the illumination light toward the imaging FOV.

11. The system of claim 1, wherein neither the first cover plate nor the second cover plate has an image modifying element.

12. An imaging system comprising:
a housing; and
an imaging sub-assembly mounted in the housing, the imaging sub-assembly including:
an imager to capture an image of a portion of an environment in a field of view (FOV);
an aiming light source mounted in the housing configured to generate a beam of light, wherein the aiming light source is offset from the imaging sub-assembly; and
an illumination light source configured to generate illumination light,
wherein the housing is configured to receive interchangeable first and second cover plates for mounting to the housing in front of the imaging sub-assembly to form an external cover for the housing and sealably protect the imager from an environment, wherein the first and second cover plates have respective first and second passive optical elements that modify the beam of light to form respective aiming patterns, and wherein at least one of the first cover plate or the second cover plate has an optical element that modifies the illumination light.

13. A method of assembling a machine vision device, the method comprising:

providing an assembly including:
  a housing having a cavity;
  an imaging sub-assembly in the cavity;
  an aiming light source in the cavity configured to generate a beam of light, wherein the aiming light source is offset from the imaging sub-assembly; and
  an illumination light source;

configuring the imaging sub-assembly to capture an image of a portion of an environment in an imaging field of view (FOV);

configuring the illumination light source to generate illumination light; and selecting one of interchangeable first and second cover plates based at least on the configured imaging FOV; and mounting the selected one of the interchangeable first and second cover plates to the housing to form an external cover for the housing and sealably protect the imaging sub-assembly from an environment, wherein the first and second cover plates have respective first and second passive optical elements that modify the beam of light to form respective first and second aiming patterns, and wherein at least one of the first cover plate or the second cover plate has an optical element that modifies the illumination light.

14. The method of claim 13, further comprising:
unmounting the selected one of the interchangeable first and second cover plates from the housing;
configuring the imaging sub-assembly to capture an image of a portion of an environment in a different imaging FOV; and
mounting the unselected one of interchangeable first and second cover plates to the housing.

15. The method of claim 13, wherein neither of the first cover plate or the second cover plate has an image modifying element.

16. The method of claim 13, wherein the imaging sub-assembly includes a lens group configurable to support first and second imaging FOVs, wherein the first passive optical element, when the first cover plate is mounted, forms a first aiming pattern in the first imaging FOV, and wherein the second passive optical element, when the second cover plate is mounted, forms a second aiming pattern in the second imaging FOV.

17. The method of claim 13, wherein the first and second cover plates are integrally formed.

18. The method of claim 13, wherein the first passive optical element includes:
one or more diffractive optical elements; and
an optical wedge configured to adjust an axis of an aiming pattern relative to an axis of the beam of light, and
wherein the first passive optical element is at least one of formed, molded, or inset in the first cover plate.

19. The method of claim 13, wherein the aiming light source includes a laser diode and a collimating lens.

20. The method of claim 13, wherein the third optical element includes a lens molded into the first cover plate to focus the illumination light and direct the illumination light toward the imaging FOV.

* * * * *